Patented May 14, 1935

2,001,063

UNITED STATES PATENT OFFICE 2,001,063

MANUFACTURE OF BZ1, BZ1'-DIBENZANTHRONYL

Edward T. Howell, Milwaukee, Wis., assignor to E. I. du Pont de Nemours & Company, Wilmington, Del., a corporation of Delaware No Drawing. Application December 27, 1932, Serial No. 648,978

17 Claims. (Cl. 260—61)

This invention relates to the manufacture of Bz1, Bz1'-dibenzanthronyl.

It is an object of this invention to provide an efficient and economical process for the production of Bz1, Bz1'-dibenzanthronyl.

It is a further object of this invention to produce Bz1, Bz1'-dibenzanthronyl containing a minimum amount of alkali-insoluble oxy-dibenzanthronyl bodies.

Other and further important objects of this invention will appear as the description proceeds.

Bz1, Bz1'-dibenzanthronyl has been prepared in the art by oxidation of benzanthrone. The reagents generally employed are manganese dioxide and sulfuric acid. Although the product appears to be of considerable importance, and although many searchers have worked in this field, the processes known in the art do not give a satisfactory product for the reason that higher oxidation products are invariably formed as by-products. Among these are a product known as "oxybenzanthrone", which may be removed by reducing the entire mass with alkaline bisulfite and then extracting with aqueous alkali, and a product termed "oxy-dibenzanthronyl", which is but sparingly soluble in alkali either before or after reduction and can therefore not be removed by this method. Other methods of extraction or separation also fail, for the reason that this impurity resembles Bz1, Bz1'-dibenzanthronyl in most of its properties as regards solubility in various solvents. Its presence is nevertheless objectionable, because it diminishes the tinctorial strength and dulls the shade of vat dyestuffs subsequently produced from the dibenzanthronyl. This is particularly noticeable and particularly damaging in the case of "Jade Green" (dimethoxy-dibenzanthrone) when produced from the said intermediate.

Now I have found that a product substantially free of the undesirable alkali-insoluble by-products may be produced if the reaction is carried out under such mild conditions as to leave in the reaction mass substantial amounts of unchanged benzanthrone.

The mild conditions requisite for my invention may take one of two forms. According to one method sulfuric acid of about 80% concentration is used as solvent. The time of reaction then need not be particularly limited. According to the other method the reaction proceeds along well known lines, using concentrated sulfuric acid, but the reaction is not permitted to continue until full consumption of the benzanthrone. Instead the reaction mass is diluted, drowned in water, or otherwise made to discontinue the reaction, at that instant when the amount of unreacted benzanthrone is still about 30 to 40% of the initial quantity. Aside from these two points, some or all of the other mild conditions mentioned in the art may be used, such as the employment of low temperatures (0° to 5° C.), avoiding excessive quantities of the oxidizing agent, use of manganic sulfate instead of manganese dioxide, etc. These additional mild conditions are particularly desirable in that modification of my invention wherein concentrated sulfuric acid is used, and the extent of the reaction is controlled by the time element.

Offhand, the improvement introduced by my novel process appears paradoxical. It appears as though in an effort to eliminate one impurity (oxy-dibenzanthronyl) from the main reaction mass, a larger proportion of another impurity (benzanthrone) is introduced. It happens, however, that benzanthrone can be readily separated from Bz1, Bz1'-dibenzanthronyl, for instance, by extraction with toluene or by fractional crystallization from sulfuric acid, while oxy-dibenzanthronyl cannot be separated so readily. The substitution, therefore, of one impurity for another enables me to prepare eventually Bz1, Bz1'-dibenzanthronyl of exceptionally high purity.

Another advantage of my process is that the mixture of Bz1, Bz1'-dibenzanthronyl and benzanthrone is such a favorable combination that when subjected to successive caustic fusion and oxidation it leads to a unitary product, namely dihydroxy-dibenzanthrone in high state of purity. This process is more completely described and claimed in my copending application of even date, Ser. No. 648,977, issued as Patent No. 1,967,617, July 24, 1934. Since conversion into dihydroxy-dibenzanthrone is one of the main commercial outlets for Bz1, Bz1'-dibenzanthronyl, it is obvious that the replacement of the alkali-insoluble impurity by benzanthrone constitutes a great improvement upon the main product.

The above effect was not to be foreseen. It is well known, for instance, that when benzanthrone is oxidized by means of manganese dioxide and dilute sulfuric acid, formation of oxy bodies is favored. German Patent 515,327 takes advantage of this very fact to produce oxy-benzanthrone in good yield, substantially free of Bz1, Bz1'-dibenzanthronyl. This patentee observed that "the formation of Bz1, Bz1'-dibenzanthronyl recedes as the concentration of the sulfuric acid employed diminishes". It was hardly to be foreseen that the lower concentrations, which apparently favor the formation of oxy-benzanthrone, would disfavor the formation of oxy-dibenzanthronyl. Nor was it at all known that the formation of oxy-dibenzanthronyl enters in at a certain deferred stage of the oxidation instead of at the very beginning, whereby to enable one to separate this side reaction from the main reaction by limiting the time of reaction.

Accordingly, my invention may be said to consist of a process of oxidizing benzanthrone under conditions preventing complete consumption of the benzanthrone, whereby the formation of oxy-dibenzanthronyl bodies is discouraged, while Bz1, Bz1'-dibenzanthronyl is formed in sufficiently large proportion to make the process commercially practical. Generally speaking, I may employ one of two methods of control: An acid-concentration control and a time control.

In the acid-concentration control method, sulfuric acid of about 80% concentration is employed. This concentration may vary by a few per cent either way, say from 78 to 83%. The time of the reaction in this case need not be rigidly controlled. Nor is it necessary to work with diminished quantities of manganese dioxide in this method. On the contrary, slight excesses up to 50% may be employed without injury.

In the time control method the initial ingredients may be the same as in any of the previous methods in the art. Diminished quantities of oxidizing agent and low temperatures are particularly desirable. The time allowed for the ingredients to be in contact, however, should be cut down to but a fraction of the time prescribed in the art for each respective process. Another way of determining the time limit is to take samples of the oxidation mixture, and to discontinue the reaction (as by dilution or drowning in water) as soon as the amount of benzanthrone present drops below say 40 to 30% of the initial quantity. At this point the product contains a minimum amount of the higher oxidation products, but still contains a sufficiently high percentage of Bz1, Bz1'-dibenzanthronyl to render the process economically practical where this intermediate is the main object of the reaction. The color of the reaction mass, after some experience with the process, may also be used as a guide to determine the desirable end point.

If desired, the two modes of control above indicated may be combined. For instance, sulfuric acid of any concentration between 80 and 100% may be used, provided care is taken to avoid excessive quantities of the oxidizing agent and to discontinue the reaction at a point of time where the amount of remaining unchanged benzanthrone has dropped to between 40 and 30% of its initial value.

It is, of course, understood that the oxidation may be stopped while even larger quantities of benzanthrone remain unchanged, the amount left depending upon the cost of recovering it as compared with the added value of the extra purity of the 13,13'-dibenzanthronyl obtained. We therefore do not wish to imply that 40% unchanged benzanthrone is the maximum amount that may be left in the reaction mass for the proper and practical working of this process.

It will be understood that although I am referring above to the reaction product as composed chiefly of two components, namely benzanthrone and Bz1, Bz1'-dibenzanthronyl, I am not implying that it is absolutely free of other by-products. Unquestionably, certain amounts of oxy-benzanthrone are formed along and must be removed by known methods, such as successive reduction with bisulfite and extraction with aqueous alkali. Very likely, certain amounts of the objectionable oxy-dibenzanthronyl bodies are formed also, the precise amount depending on the amount of time selected for stopping the reaction. Nevertheless, the amounts of impurities thus formed are considerably less than by the hitherto practiced processes, as can be readily ascertained by comparing the tinctorial yields of dyestuffs prepared from this intermediate. In actual practice, I have found the tinctorial yield of "Jade Green" obtainable from dihydroxy-dibenzanthrone prepared from dibenzanthronyl obtainable according to this invention to be fully 30 to 40% greater than the tinctorial yield where the Bz1, Bz1'-dibenzanthronyl has been prepared by the previous processes of the art. It will be understood of course that tinctorial yield is a quantitive property taking into consideration both the weight or mass of the product produced as well as its state of purity.

Without limiting my invention to any particular procedure, the following examples are given for the purpose of illustrating the same. Parts given are by weight.

*Example 1*

100 parts of purified benzanthrone (m. p. 168–170°) are dissolved in 2400 parts of 80% sulfuric acid and cooled to 2° C. 60 parts of pyrolusite (86–87% $MnO_2$) are then added during a period of 7 to 8 hours at 2–4° C., and the reaction mixture is stirred for 15 to 20 hours at that temperature. Microscopic examination at this stage shows well defined hair-like crystals. 165 parts of water are then slowly added and the reaction mixture is filtered on a porous plate filter, unchanged benzanthrone as well as any oxybenzanthrone formed passing through in the filtrate. After washing with several small portions of 75–80% sulfuric acid and sucking as dry as possible, the filter cake is digested in water, boiled with excess sodium bisulfite to remove residual manganese, filtered and washed, and dried. The product so obtained consists of a yellowish powder, crystallizable from nitrobenzol to a melting point of 425° C., and soluble in concentrated sulfuric acid with a brilliant deep cherry red color with reddish fluorescence.

If the strong acid filtrate is drowned in water, boiled with bisulfite, filtered and washed first with water, then with dilute caustic soda solution, unchanged benzanthrone, is recovered which may be used in the next oxidation.

*Example 2*

The oxidation is carried out as in Example 1 up to the filtration on porous plate, instead of which the reaction mixture is now drowned in 12,000 parts of water, boiled with 60 parts of sodium bisulfite, filtered and washed acid free. The filter cake is now digested in boiling dilute caustic soda solution, filtered, washed and dried. The dried crude product is then agitated with 750 parts toluol, heated to 60–70° C., filtered, washed with a few small portions of warm toluol, and dried. The product so obtained is practically identical with that of Example 1.

Unchanged benzanthrone is recovered from the toluol filtrate by steam distillation. Other light solvents, such as xylol, may be used instead of toluol.

Instead of carrying out an extraction, the unchanged benzanthrone may be left with the dibenzanthronyl and used for the preparation of dyestuffs to give a unitary product if treated as in Examples 3 and 4 of Patent No. 1,967,617.

*Example 3*

100 parts purified benzanthrone (m. p. 168–170°) are dissolved in 2000 parts of 94% sulfuric acid and cooled to 2° C. There are then added 40 parts of finely ground pyrolusite (86–87% $MnO_2$) during a period of 3 hours at 2–5°. After stirring 1 hour more at 2–5°, the reaction mixture is poured into 10,000 parts of water, treated with 40 parts sodium bisulfite, brought to a boil, diluted with 10,000 parts of cold water, filtered, washed acid free and dried. If desired, an alkali extraction following substantially the same procedure as in Example 2 may be carried out at this point prior to drying. The product so obtained consists of a yellowish brown powder containing approximately 65% Bz1, Bz1'-dibenzanthronyl and approximately 35% unchanged benzanthrone.

From this product substantially pure Bz1, Bz1'-dibenzanthronyl may be recovered by solvent extraction of the unchanged benzanthrone as in Example 2, above giving a product which after crystallization from nitrobenzene has a melting point of 414–416° C. Alternatively, the separation of the dibenzanthronyl from benzanthrone may be effected by taking advantage of their different solubilities in 67 to 80% sulfuric acid, as in Example 1. For this purpose, the concentrated reaction mass, after stirring for 1 hour at 2 to 5° C., is diluted slowly with 500 parts of water, filtered on a porous plate and further worked up as in Example 1. Finally the mixed product as obtained in the first paragraph of this example, may be used directly for the manufacture of dihydroxy-dibenzanthrone, as described for instance in Examples 3 and 4 of Patent No. 1,967,617.

It will be understood that many variations and modifications are possible in the preferred processes above set forth without departing from the spirit of this invention.

I claim:

1. In the process for preparing Bz1, Bz1'-dibenzanthronyl, the step which comprises oxidizing benzanthrone in sulfuric acid solution with an oxidizing agent, and regulating the conditions so that the reaction is stopped while there remains in the mass a substantial amount of unchanged benzanthrone.

2. In the process for preparing Bz1, Bz1-dibenzanthronyl, the step which comprises oxidizing benzanthrone in sulfuric acid solution with manganese dioxide, and regulating the conditions so that the reaction is stopped while there remains in the mass a substantial amount of unchanged benzanthrone.

3. In the process for preparing Bz1, Bz1'-dibenzanthronyl, the step which comprises oxidizing benzanthrone in sulfuric acid solution with manganese dioxide, and regulating the conditions so that the reaction is stopped while there remains in the mass a substantial amount of unchanged benzanthrone, and separating the latter from the final product.

4. In the process for preparing Bz1, Bz1'-dibenzanthronyl, the step which comprises oxidizing benzanthrone in sulfuric acid solution with manganese dioxide, and regulating the conditions so that the reaction is stopped while there remains in the mass a substantial amount of unchanged benzanthrone, and removing from the reaction product by-product oxy-benzanthrone and unchanged benzanthrone.

5. In the process for preparing Bz1, Bz1'-dibenzanthronyl, the step which comprises oxidizing benzanthrone in sulfuric acid solution with manganese dioxide, and regulating the conditions so that the reaction is stopped while there remains in the mass a substantial amount of unchanged benzanthrone, subjecting the product to reduction with sulfurous acid and extraction with aqueous alkali to remove alkali-soluble oxidation by-products, and then to extraction with an organic solvent to remove unchanged benzanthrone.

6. The process of producing Bz1, Bz1'-dibenzanthronyl relatively free of alkali-insoluble higher oxidation products, which comprises reacting upon benzanthrone with manganese dioxide in a medium of sulfuric acid of about 80% concentration.

7. The process of producing Bz1, Bz1'-dibenzanthronyl relatively free of higher oxidation products, which comprises reacting upon benzanthrone with manganese dioxide in a medium of sulfuric acid of about 80% concentration, and extracting the reaction product with alkali to remove alkali-soluble impurities.

8. The process of producing Bz1, Bz1'-dibenzanthronyl relatively free of higher oxidation products, which comprises reacting upon benzanthrone with manganese dioxide in a medium of sulfuric acid of about 80% concentration, extracting the reaction product with alkali to remove alkali-soluble impurities, and further extracting the residual mass with toluene to remove unchanged benzanthrone.

9. The process of producing Bz1, Bz1'-dibenzanthronyl relatively free of alkali-insoluble higher oxidation products, which comprises reacting upon benzanthrone with manganese dioxide in a medium of sulfuric acid of about 80 to 100% concentration, and discontinuing the reaction before the quantity of unchanged benzanthrone has dropped to below 30% of its initial value.

10. The process of producing Bz1, Bz1'-dibenzanthronyl relatively free of alkali-insoluble higher oxidation products, which comprises reacting upon benzanthrone with manganese dioxide in a medium of sulfuric acid of about 80 to 100% concentration, and discontinuing the reaction at a moment when the amount of unchanged benzanthrone in the mass is between 30 and 40% of its initial value.

11. A technical Bz1, Bz1'-dibenzanthonyl, comprising essentially a mixture of Bz1, Bz1'-dibenzanthronyl and benzanthrone, and containing substantially no oxy-dibenzanthronyl, the benzanthrone being present in amounts from about 30 to 40% of the total mixture.

12. The process of preparing Bz1, Bz1'-dibenzanthronyl of high purity which comprises oxidizing benzanthrone by means of manganese dioxide and sulfuric acid, and regulating the conditions so that the reaction is stopped while a substantial amount of unchanged benzanthrone still remains in the reaction mass, adjusting the concentration of the acid to between 67 and 80%, and filtering the mass to give Bz1, Bz1'-dibenzanthronyl substantially free of benzanthrone.

13. The process of preparing Bz1, Bz1'-dibenzanthronyl of high purity which comprises oxidizing benzanthrone by means of manganese dioxide and sulfuric acid, and regulating the conditions so that the reaction is stopped while a substantial amount of unchanged benzanthrone still remains in the reaction mass, and separating the unchanged benzanthrone from the dibenzanthronyl by fractional crystallization from sulfuric acid of between 67 and 80% strength.

14. The process of producing Bz1, Bz1'-dibenzanthronyl relatively free of alkali-insoluble higher oxidation products, which comprises reacting upon benzanthrone with manganese dioxide in a medium of sulfuric acid of about 80% concentration, diluting the reaction mass to a point where the dibenzanthronyl formed is precipitated, while the unchanged benzanthrone stays in solution, and filtering to recover the dibenzanthronyl.

15. The process of producing Bz1, Bz1'-dibenzanthronyl relatively free of alkali-insoluble higher oxidation products, which comprises reacting upon benzanthrone with manganese dioxide in a medium of sulfuric acid of about 80% concentration, diluting the reaction mass to about 75% acid concentration, and filtering off the precipitated dibenzanthronyl.

16. A technical Bz1, Bz1'-dibenzanthronyl substantially free of higher oxidation products and which, after recrystallization from nitrobenzene, has a melting point of about 414–425° C.

17. A technical Bz1, Bz1'-dibenzanthronyl in the form of a yellowish powder, crystallizable from nitrobenzol to a melting point of 425° C., and soluble in concentrated sulfuric acid with a brilliant deep cherry red color with reddish fluorescence.

EDWARD T. HOWELL.